Sept. 25, 1951  J. A. DIETER  2,568,794
SEALING APPARATUS
Filed Aug. 1, 1947  7 Sheets-Sheet 1

INVENTOR.
JULIAN A. DIETER
BY
ATTORNEY

Sept. 25, 1951     J. A. DIETER     2,568,794
SEALING APPARATUS
Filed Aug. 1, 1947     7 Sheets-Sheet 2

FIG.2.

INVENTOR.
JULIAN A. DIETER
BY
ATTORNEY

Sept. 25, 1951   J. A. DIETER   2,568,794
SEALING APPARATUS

Filed Aug. 1, 1947   7 Sheets-Sheet 3

INVENTOR.
JULIAN A. DIETER
BY
ATTORNEY

Sept. 25, 1951 J. A. DIETER 2,568,794
SEALING APPARATUS
Filed Aug. 1, 1947 7 Sheets-Sheet 5

INVENTOR.
JULIAN A. DIETER
BY
*H. C. Liesem*
ATTORNEY

Sept. 25, 1951 J. A. DIETER 2,568,794
SEALING APPARATUS
Filed Aug. 1, 1947 7 Sheets-Sheet 6

INVENTOR.
JULIAN A. DIETER
BY
ATTORNEY

Sept. 25, 1951 J. A. DIETER 2,568,794
SEALING APPARATUS
Filed Aug. 1, 1947 7 Sheets-Sheet 7

INVENTOR.
JULIAN A. DIETER
BY
ATTORNEY

Patented Sept. 25, 1951

2,568,794

UNITED STATES PATENT OFFICE 2,568,794

SEALING APPARATUS

Julian A. Dieter, Union, N. J., assignor to Bristol-Myers Company, New York, N. Y., a corporation of Delaware Application August 1, 1947, Serial No. 765,331

6 Claims. (Cl. 219—6)

This invention relates to an improved apparatus and method for automatically filling and hermetically sealing containers, such as collapsible metallic tubes. The seal is effected in the present invention with the aid of a high-frequency electromagnetic field.

The present invention provides apparatus for sealing a collapsible tube at its filling end tightly enough so that it may function satisfactorily as a container for liquids as well as pastes. There have heretofore been efforts to seal tubes this tightly. One type of apparatus previously suggested provides means for passing a hot wire along the end of the tube in order to melt a portion thereof sufficiently to form a seal; but such apparatus has been rather inefficient, requiring, besides, the use of a flux which at best is undesirable.

An object of the present invention is to provide apparatus adapted to seal collapsible tubes tightly, uniformly and rapidly.

In accomplishing this sealing, the present apparatus employs a high-frequency electromagnetic field, adapted to heat seal or weld the end of the tube. An object of the invention is to provide apparatus adapted to assure that the end of the tube will be heated uniformly to provide a tight, uniform seal, preventing any tendency toward over-heating in one region and under-heating in another region. The apparatus of the present invention for assuring this uniform heating and sealing is particularly advantageous when a plurality of tubes are being sealed simultaneously.

Since the sealing means of the present apparatus seals tubes at high speed, it follows that tube-filling means which cooperate with the sealing means must also be capable of operating at high speed. One difficulty encountered with high-speed filling apparatus is a tendency toward "air-locking." By this is meant the tendency for air to become entrapped in the tube by liquid above it, preventing, at least for a short time, proper filling of the tube.

An object of the present invention is to provide filling means capable of filling the tubes properly, without air-locking, rapidly enough to cooperate efficiently with the tube sealing means herein disclosed.

Another object is to provide apparatus adapted to bond together tube walls comprising thin sheets of metal of low melting point to form a strong, tight joint.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein

Fig. 3 is a front elevational view of filling apparatus, comprising a portion of the apparatus shown toward the right in Figs. 1 and 2.

Fig. 4 is a vertical sectional view through a controllable nozzle of the filling apparatus shown in Fig. 3, the position of the section being substantially in the plane 4—4 as indicated in Fig. 3. In Fig. 4 the nozzle control means is shown in a position to stop the flow of liquid from the nozzle.

Fig. 5 is a view similar to Fig. 4, except that the control means for the nozzle is in a position to permit liquid to flow from the nozzle, as when a filling operation is actually taking place.

Fig. 6 is a horizontal cross-sectional view through the controllable nozzle, in a plane indicated at 6—6 in Fig. 4.

The illustrative apparatus includes a series of tube holders and means to advance said holders, together with tubes therein, to a series of stations where means are provided to perform different operations, such as filling the tubes, and closing and sealing the tubes.

The filling means comprises a downwardly extending nozzle having an improved valve or nozzle-closing mechanism for controlling the flow of liquid from the delivery end of this nozzle. This valve features a plug tapering upwardly to smaller diameter, adapted to be seated against the lip of the nozzle. The plug is carried at the lower end of a vertically reciprocable rod or valve stem. When the valve stem is raised, the plug closes the nozzle and shuts off any fluid flow therefrom. The valve is provided with pins mounted on the plug, which, when the valve is open, serve to modify or break up the stream of liquid flowing from the nozzle in such a way as to prevent air-locking of the tubes, and these pins further serve to guide the plug and stem to assure precise positioning of same with respect to the axis of the nozzle during their vertical reciprocation. At the tube closing and sealing station there is provided a pair of opposed jaws adapted to open by horizontal movement in opposite directions for receiving a plurality of tubes therebetween, and to shut for closing the filling end of each tube. The jaws are primarily of metal but on their opposed, vertical working faces, they are provided with thin dieletric strips. There is provided a source of high-frequency electric current. Looping around the plurality of tubes at the closing and sealing station is a current path, including the metallic portions of said jaws as a principal portion thereof, connected to the current source. This path is, in the present illustration, complete only when the jaws are closed. The dielectric strips on the vertical working faces of the jaws prevent the tubes themselves from short-circuiting the current path. Separate timing means are provided to cause the electric current source to feed high-frequency current around said loop for a short interval, for the purpose of inductively heating and thereby sealing the end of each tube while the tube is pressed shut between said jaws. The jaws are, as an important feature of the present invention, especially shaped to assure uniform heating and sealing of the tubes along the flat edge formed at their end which is sealed. More particularly, the jaws may be provided with slots or channels positioned to modify the current flow through the jaws so that the ratio of the current density near the center of the working faces of the jaws to the current density near ends of the working faces of the jaws is less than would be the case if the slots were absent. In one embodiment, the opposed vertical faces of the metallic portion of the jaws are provided with a vertical channel so as to diverge one from another in a small region between the tubes. In regions where the jaws actually engage the tubes, the jaws may be substantially planular or at any rate, shaped to meet or bite together almost completely. This special configuration guides the flow of electric current in a path to assure uniform heating and sealing of the tubes. Further details and features will be given below.

Tube conveyor

The apparatus for conveying the tubes from station to station for the performance of various operations may be of a well-known type, and for this reason a detailed description of this portion of the mechanism is unnecessary.

Figure 1:
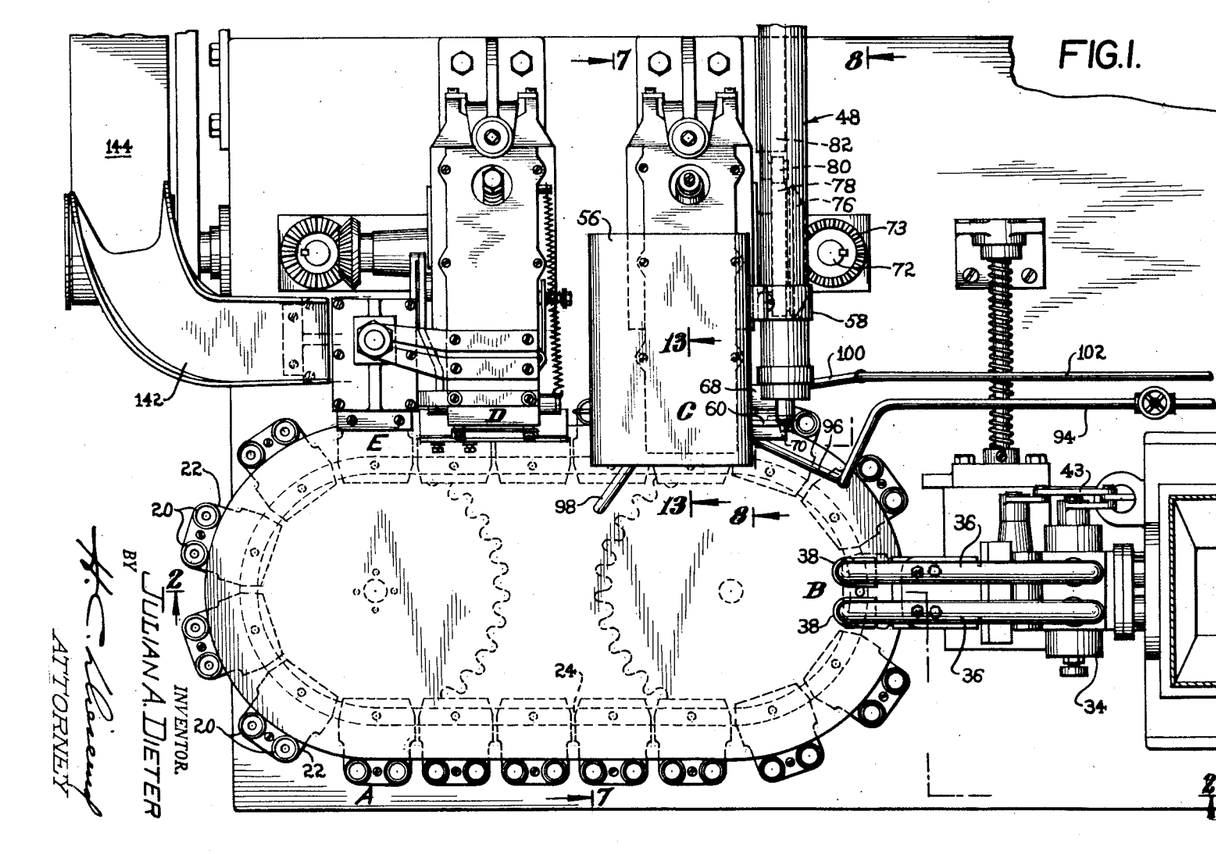
Fig. 1 is a plan view of apparatus containing a preferred embodiment of the invention, showing the relative locations of the stations at which various operations are performed, and the apparatus for performing such operations.

Reference is first made to Fig. 1, which shows the relative positions of the various stations. The apparatus is provided with a series of tube holders 20 of dielectric material, which may be carried in pairs upon a series of blocks 22 attached to a conveyor chain 24. The chain is moved intermittently, by an intermittent driving apparatus which may, for example, be of the same general type as that employed in United States Patent 2,213,317 issued September 3, 1940, to Palmer J. Lathrop so as to advance each pair of tube holders in succession to the various stations. The tubes come to a complete stop at each of the stations.

Figures 13, 14, 15, 16:
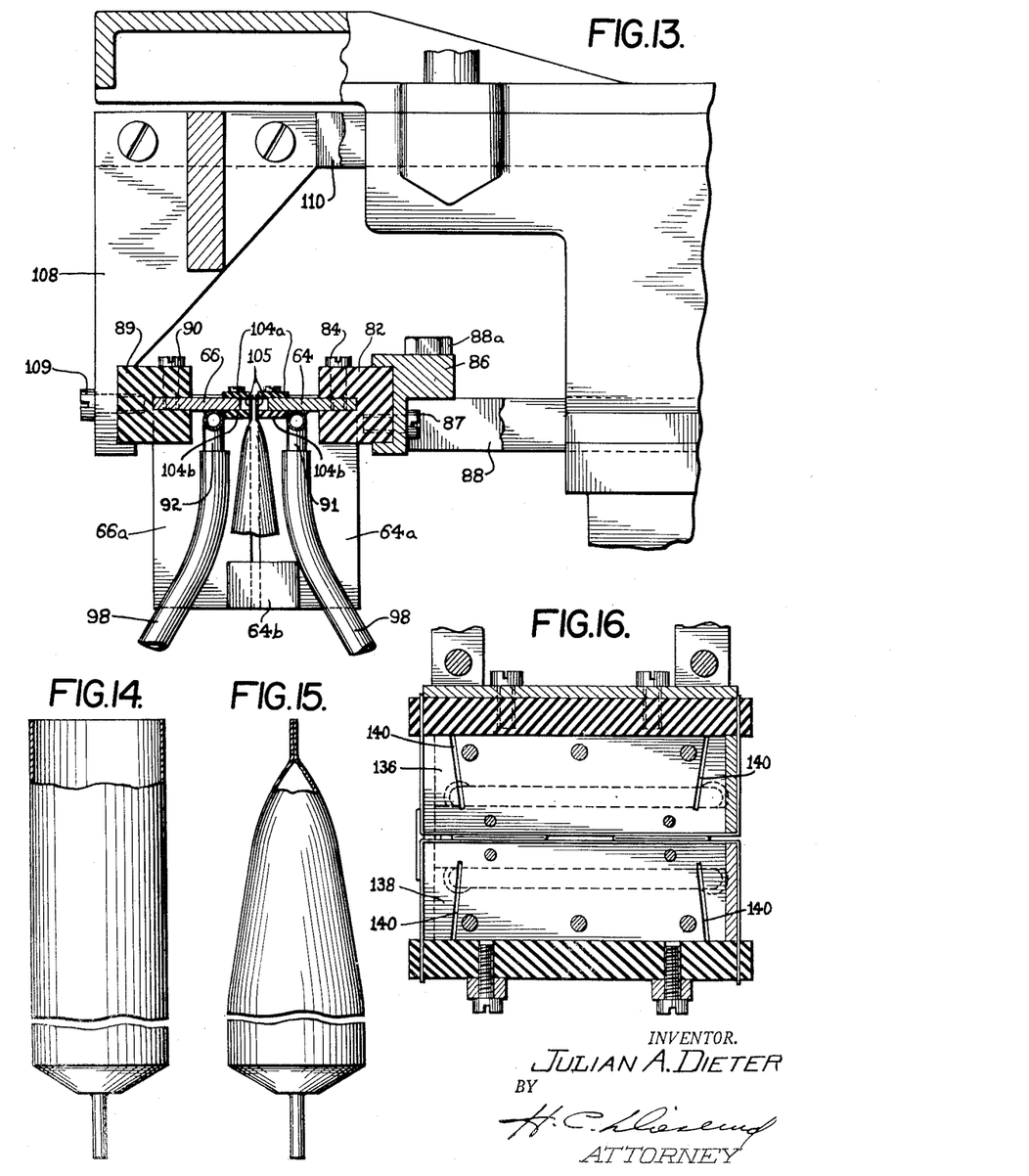
Fig. 13 is a vertical sectional view through the jaws of Fig. 10, the position of the section being indicated in Fig. 1 at 13—13.
Fig. 14 is an elevational view of a generally cylindrical collapsible tube, shown partly in section, before said tube has been closed or sealed.
Fig. 15 is a view partly in elevation and partly in section, of a tube which has been closed and sealed. The section is taken in a plane perpendicular to the flat edge of the end of the tube.
Fig. 16 is a horizontal sectional view of a still different embodiment of the jaws, the section being taken at the upper surface of the metallic jaws proper, featuring slots therein of a modified type.

Station A may be considered to be a loading station, where the operator inserts tubes into the tube holders. These tubes may in this example be assumed to be generally cylindrical in shape near their filling end and throughout most of their length as shown in Fig. 14. They may satisfactorily be of a low-melting alloy of tin, lead or the like. Station B is a filling station. Station C is a sealing station, where the ends of the tubes are mechanically closed and hermetically sealed by inductive heating. At station D the ends of the tubes may be folded or crimped or otherwise mechanically manipulated for the purpose of strengthening same. At station E the tubes are removed from the tube holder and dropped down a chute onto a conveyor belt.

Filling apparatus

The filling apparatus may be seen in Figs. 1–7. In general, there are provided a pair of nozzles 26 adapted to be lowered into the tubes, and adapted to supply liquid to these tubes. The filling operation and all other operations herein described are completely automatic. The operator need merely start the device by a clutch control, and thereafter place the tubes in the tube holders. At the filling station the nozzles are lowered into the tubes, fluid enters the tubes, fluid is turned off automatically after a predetermined amount has flowed into the tubes, and the nozzles are lifted from the tubes. This all occurs during the interval when a given pair of tubes is stopped beneath the filling nozzles.

Figures 3, 4, 5, 6:
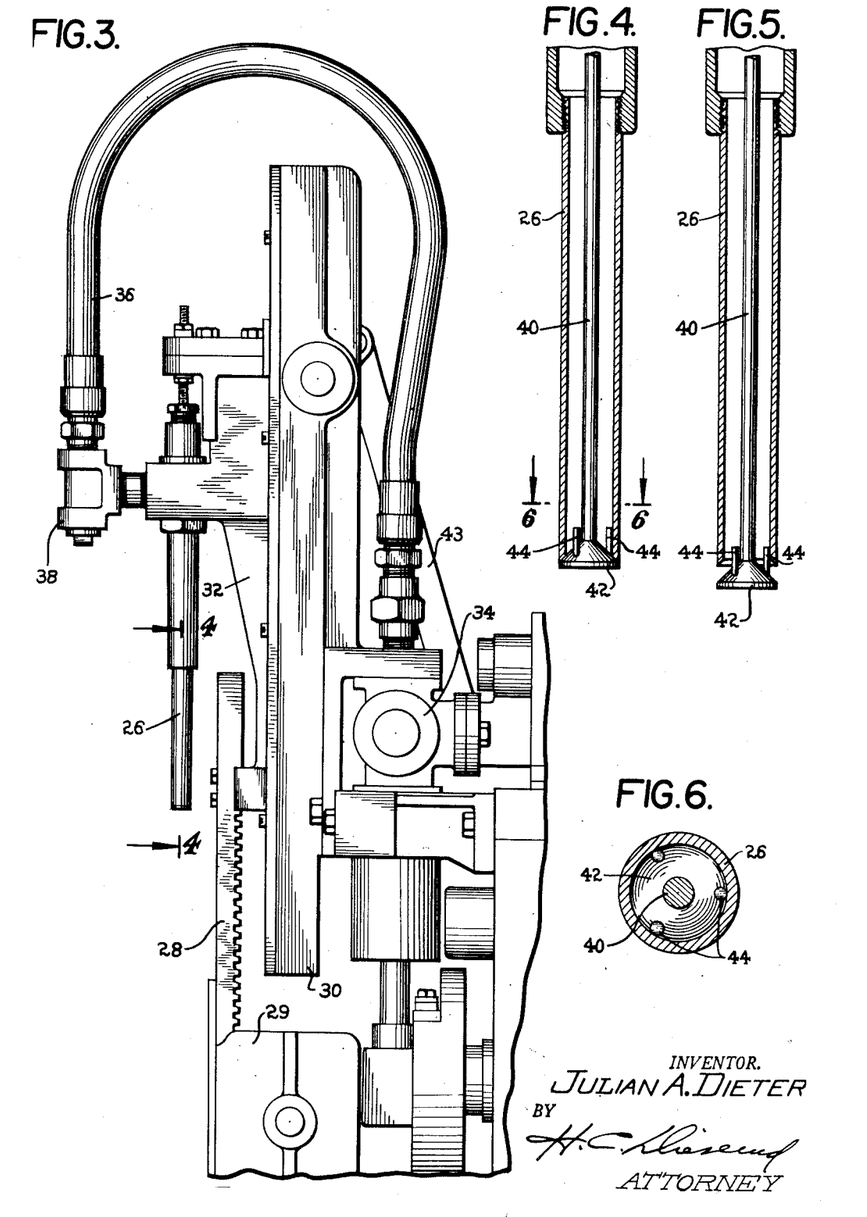

Reference is made to Fig. 3 which shows the filling apparatus somewhat in detail. There is provided a rack 28 mounted for vertical reciprocation in a frame member 29. By a cam and a series of gears not shown in detail, the rack 28 is caused to reciprocate vertically. There is provided a stationary frame member 30 adapted to carry, by suitable means, for vertical recoprocation, a movable nozzle frame 32 attached to the rack 28. The reciprocation of the rack 28 serves to reciprocate the nozzle frame 32 and hence to lift and lower the nozzles 26. The apparatus is provided with a source of the fluid with which the tubes are to be filled, and with a first valve generally indicated at 34 for controlling the flow of this fluid. This is a different valve from the previously mentioned nozzle-closing mechanism or valve. For controlling the valve 34, there is provided valve-operating means, which need not be described in detail, connected with the main source of power and suitably timed in connection with the various operations so that liquid in the proper amount and at the proper time is allowed to flow through the valve 34. There is provided a pair of conduits 36 connected to the outlet of the valve 34, and connected to the nozzles by connections 38.

In addition to the first valve 34 for controlling the flow of liquid to the tubes, there is provided a special nozzle-closing mechanism or valve, comprising a feature of the present invention. Nozzle closing mechanisms have been used heretofore, but the one herein described is particularly effective in avoiding air entrapment in the tubes, and in insuring rapid, dependable filling of the tubes without undue frothing.

Reference may be made to Figs. 4–6 for details of the nozzle closing or control apparatus. In Fig. 4 the nozzle is shown closed, while in Fig. 5 it is shown open. Each of the nozzles is provided with an axial plunger or stem 40, having at its lower end a plug 42, adapted to be snugly seated at the lower end or lip of the nozzle. The plug 42 is provided with a plurality of pins 44 adapted to serve the double purpose of guiding the stem 40 and the plug 42 and maintaining same in proper alignment with respect to the axis of the nozzle, and also the important purpose of breaking up the stream of liquid as it flows out of the nozzle, into a plurality of smaller streams. Such smaller streams are separated by zones through which air may rise as it is driven out of the tube, thereby preventing air-locking. The small streams of descending liquid are caused by the tapering or flaring shape of the plug to diverge slightly, thus causing them to be directed somewhat against the wall of the tube, which lessens the tendency for frothing.

While the illustrated embodiment employs three pins 44, generally symmetrically spaced, it will be understood that other numbers of pins might be used in some cases.

Means for operating the stem 40 are provided, adapted to be driven with the proper timing. Such means include a lever 43, cam and gear means, not shown in detail, driven from the main power source and connected to the lower end of the lever 43, adapted to drive this lever generally upwardly, and means not shown connecting the upper end of this lever with the stem 40, for lifting and lowering same, thereby effectively controlling the flow of fluid at the nozzle outlets. It will be understood that the valve 34 and the plug 42 are timed so that both allow fluid to flow simultaneously and both shut off the flow simultaneously. The valve 34 serves to shut off the pressure from the fluid source, and the plug 42 prevents fluid remaining in the nozzles from dripping out. In the present illustration the nozzle and plug may be assumed to be generally of circular cross section; the plug may however have a somewhat conical shape, tapering to smaller diameter toward the upper portion thereof.

The tubes, after being filled, are advanced by the conveyor to station C, where they are closed and sealed. Fig. 15 illustrates the appearance of a tube which has been sealed. The sealing apparatus comprises a pair of opposed jaws adapted to receive a pair of tubes therebetween and to press the ends of the tubes shut, and means, of which the jaws comprise a portion, adapted to subject the tubes to a high-frequency electromagnetic field while pressed shut. The ends of the tube are thus heated primarily by induction until at least a portion of the tubes becomes sufficiently molten to effect a seal. Without the present invention it would be extremely difficult to effect a uniform seal upon a pair of tubes simultaneously. One of the difficulties is that the heating effect tends to be non-uniform along the ends of the tubes. More specifically, when two adjacent tubes are being sealed, the adjacent portions of the respective tubes (the upper, right-hand corner of the left-hand tube between the jaws in Fig. 2, and the upper left-hand corner of the right-hand tube between these jaws) tend to become too hot for a proper seal, while the remote portions (the upper left-hand corner of the left-hand tube and the upper right-hand corner of the right-hand tube between the jaws in Fig. 2) tend to be heated relatively too little, with a result that in the region of the remote portions, the seal is faulty. The cause for this effect is not fully understood, but apparently with flat-faced jaws there are greater eddy currents induced in certain portions of the tubes than in others. It has been found that a particular design of jaws, to be described, is effective in producing uniform sealing.

Figure 2:
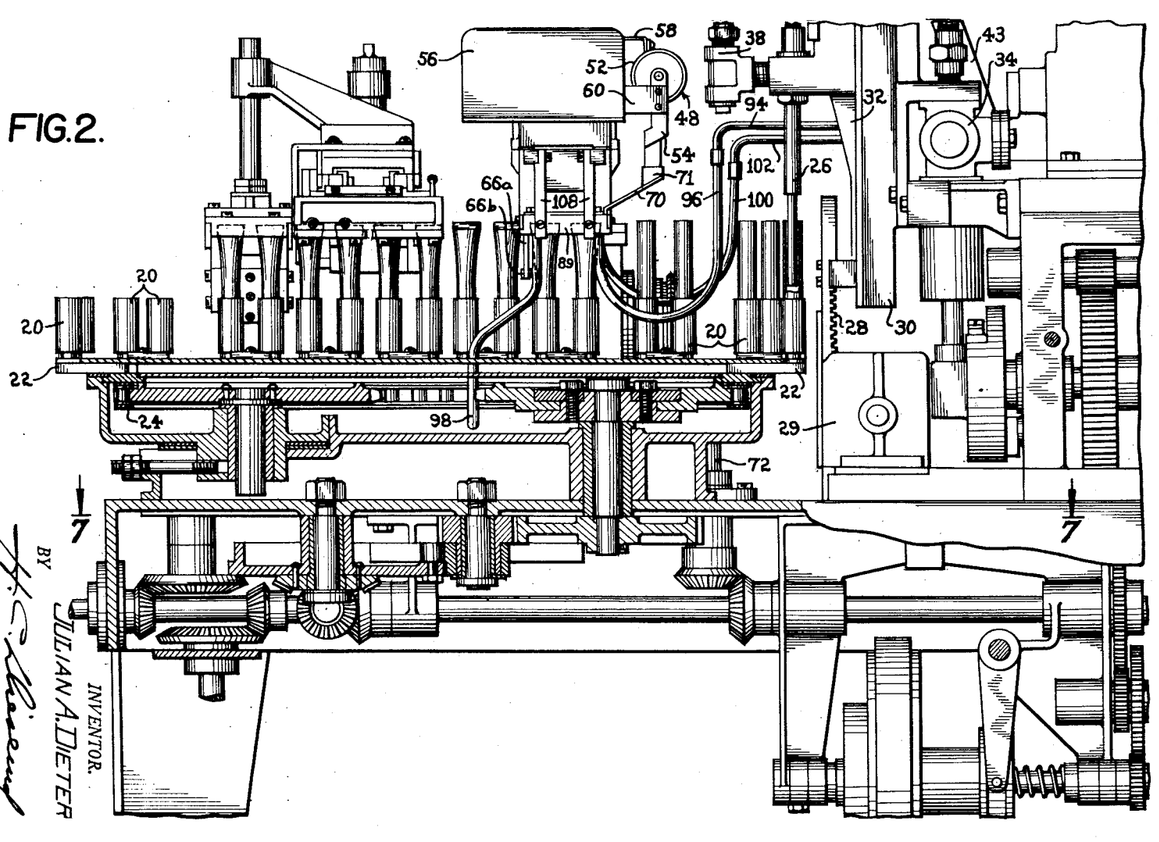
Fig. 2 is a front view of the apparatus shown in Fig. 1, partly in elevation and partly in section, in the broken plane 2—2, indicated in Fig. 1.
Figure 8:
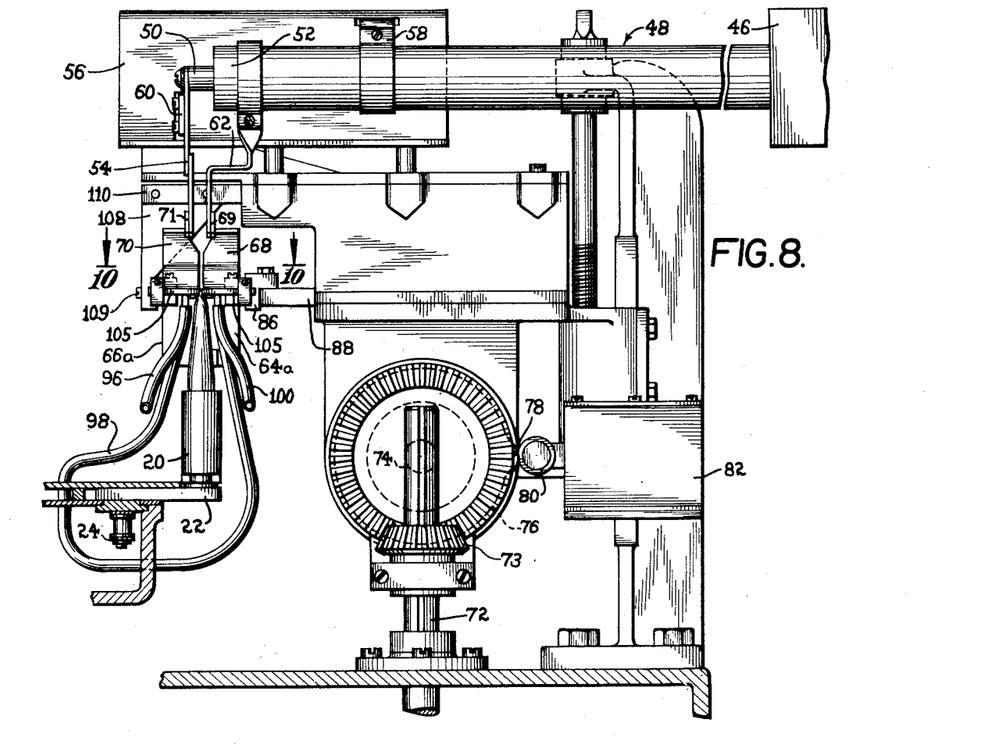
Fig. 8 is a vertical sectional view of the apparatus shown in Fig. 1, in the irregular plane indicated at 8—8, a considerable portion of the apparatus being shown in elevation. The jaws which close and aid in sealing the ends of the tubes are, in the figure, shown in the closed position. A source of high frequency electrical power is also shown in the upper right-hand corner of the figure.
Figure 9:
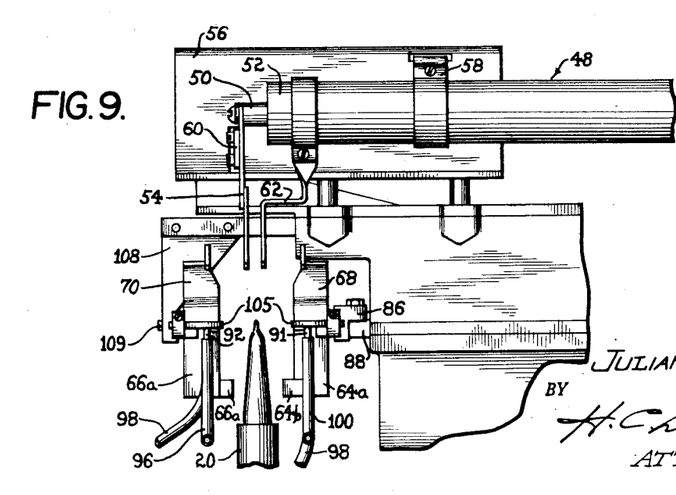
Fig. 9 is an elevational view showing a portion of the apparatus shown in Fig. 8, including the jaws. The jaws are in this figure shown in the open position, after the tubes between them have been sealed.

For supplying current to produce the aforementioned electromagnetic field, there is provided a current source comprising high-frequency oscillator 46, a portion of which is shown in Fig. 8, and a coaxial transmission line generally indicated at 48 connected thereto. The frequency of the oscillator may conveniently be approximately 27.4 megacycles per second. The coaxial transmission line has an inner conductor 50 and an outer conductor 52. Toward the free end of the transmission line 48 there is provided a stationary downwardly extending strap or connection 54 connected to the inner conductor 50. As shown in Fig. 2 there is provided a variable capacitor 56, details of which are not shown, connected in parallel with the load, having one terminal connected to the outer conductor 52 of the coaxial transmission line by a strap or connection 58, and the other terminal connected to the downwardly extending strap 54 by a strap or connection 60. The outer conductor 52 of the transmission line is also provided with a downwardly extending stationary strap-like member 62. The member 62 is, in one embodiment, bent as shown in Fig. 8 so as to be generally opposed at its lower end to a lower portion of the member 54 and spaced therefrom. The lower ends of the members 54 and 62 are the immediate source of high-frequency current for the movable jaws which engage the tubes. There is provided a rear jaw 64 and a front jaw 66. The jaws are primarily metal, but are provided with certain dielectric strips, to be described. The jaws 64 and 66 are adapted to be opened and closed by horizontal reciprocation in opposite directions. They are first moved apart to receive a pair of tubes therebetween, and are then moved toward one another to close the ends of the tubes and to aid in sealing same, as will be described. They may, in one embodiment, be provided with bent, upwardly extending strap-like members 68 and 70 respectively, having portions 69 and 71 adapted to engage the lower ends of the members 62 and 54 respectively, slightly before the jaws reach their extreme closed position. The shape of the member 68 may, in one embodiment, have the form shown in Fig. 11, the member 70 having a corresponding shape. In this embodiment, when the jaws are opened and closed, they are thus intermittently connected with the transmission line.

Figures 10, 10A, 11A, 12:
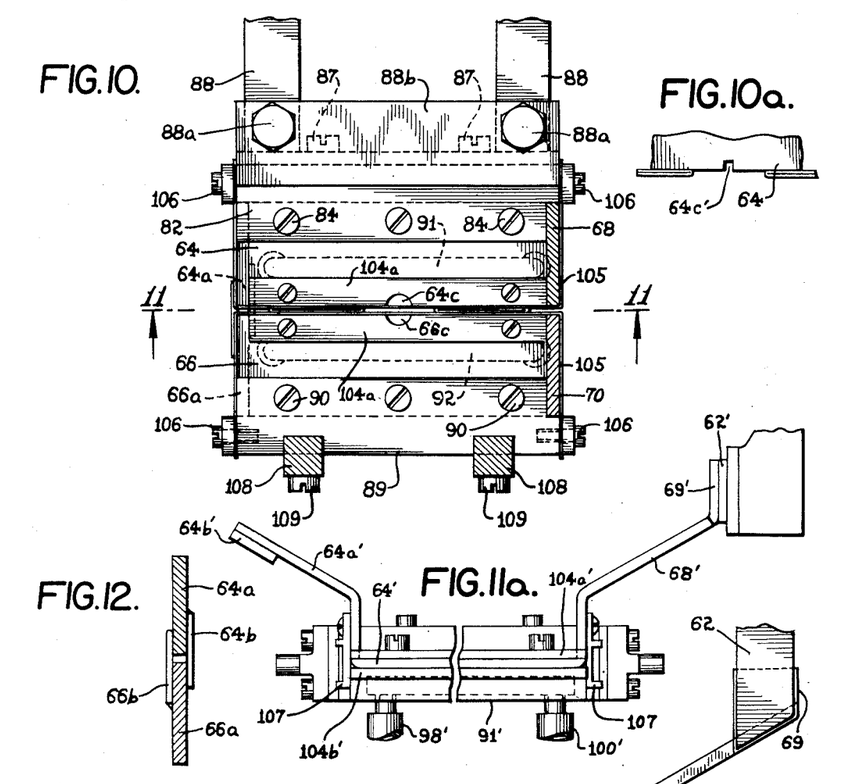
Fig. 10 is a view of the jaws as seen from above, chiefly in plan view and partly in section, in a plane indicated at 10—10 in Fig. 8.
Fig. 10a is a fragmentary plan view of a modified embodiment of a jaw, showing only a portion of the jaw near the center thereof.
Fig. 11a is a front elevational view of a modified embodiment of a rear jaw, with the center portion broken away, featuring preferred forms of contact means, different from those shown in Fig. 11.
Fig. 12 is a horizontal sectional view through an electrical connection toward the left-hand end of the jaws of Fig. 10, in a plane indicated in Fig. 7 at 12—12.

In another and somewhat more preferred embodiment a sliding type of contact is employed to provide a continuous connection, as is illustrated at the right-hand end of the rear jaw 64' shown in Fig. 11a. In this embodiment, there is provided an upwardly extending strap-like member 68' having a portion 69' bent so as to have a contact face parallel to the direction of movement of the jaw and adapted to continuously engage in sliding contact a corresponding opposed portion of a member 62' connected to the outer conductor of the transmission line. The contact faces of the members 69' and 62' may each comprise coin silver pads.

Figure 11:
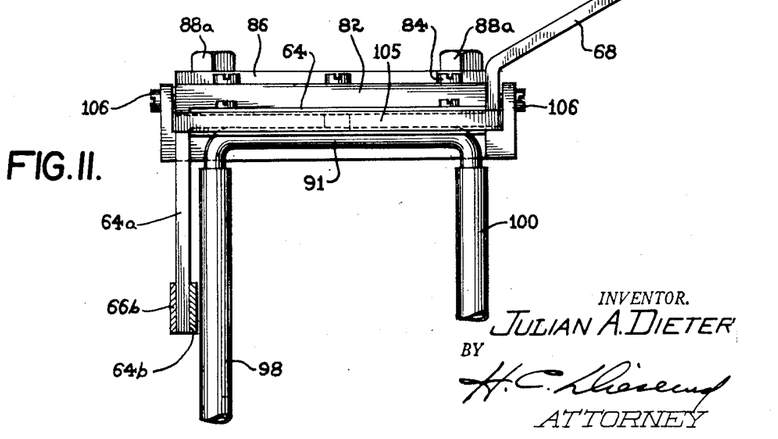
Fig. 11 is an elevational view of the rear jaw of Fig. 10, the position of the view being indicated at 11—11 in Fig. 10.

There are provided conducting means adapted to interconnect the jaws at their left-hand end when they close. One form for such means is shown in Fig. 11, and another, more preferable form is shown in Fig. 11a. The embodiment shown in Fig. 11, which is also shown in Figs. 12 and 13, will be discussed first. The jaw 64 has a bent portion 64a, in this embodiment extending downwardly, and the jaw 66 has a corresponding portion 66a, extending downwardly. These portions are generally flat or strap-like, and are approximately coplanular. Mounted on one side of the portion 64a is a flat contact member 64b, and mounted on the opposite side of the member 66a is a flat contact member 66b. When the jaws are closed or slightly before, these contact members are adapted to interconnect the portions 64a and 66a of the jaws, thereby forming an electrical connection between the jaws at the end opposite the end which is connected to the transmission line and the oscillator. The jaws, together with the connections described, thus comprise, when closed, a current path or single loop around the pair of tubes between the jaws.

In Fig. 11a there is illustrated as a preferred embodiment, a modified means for electrically interconnecting the left-hand ends of the jaws when they come together. The rear jaw 64' is provided with a bent strap-like portion 64a', extending generally upwardly at a slanting angle. Mounted on one side of the portion 64a' is a flat contact member 64b', projecting forwardly therefrom in the same general manner as does the member 64b from 64a. A front jaw corresponding to the rear jaw 64' is provided with a contact member adapted to engage the contact member 64b' of the rear jaw when the jaws are closed, to provide a current path between the jaws, around the tubes. One advantage of the upwardly extending arrangement of the portion 64a' in Fig. 11a is that the inductive field toward the left-hand end of the conducting loop formed is directed somewhat away from the nearby tubes.

The oscillator 46 does not supply power to the transmission line continuously, but timing means are provided for turning same on after the jaws are completely closed, for a very brief interval. A portion of such timing means is shown in Fig. 8. Such means includes a generally vertical rotary shaft 72, adapted to be driven continuously by the main driving means of the apparatus, a bevelled gear 73 mounted on said shaft, a horizontal shaft 74, and a gear 76 mounted thereon adapted to cooperate with the gear 72 in driving the shaft 74 continuously. Also mounted on the shaft 74 is a cam 78. There is provided a follower 80 adapted to be reciprocated horizontally. There is also provided electrical control means 82, of which the follower 80 comprises the immediate actuating means, for controlling the oscillator 46. This oscillator is thus turned on for an interval of approximately one-sixth second while the jaws are closed.

Figure 7:
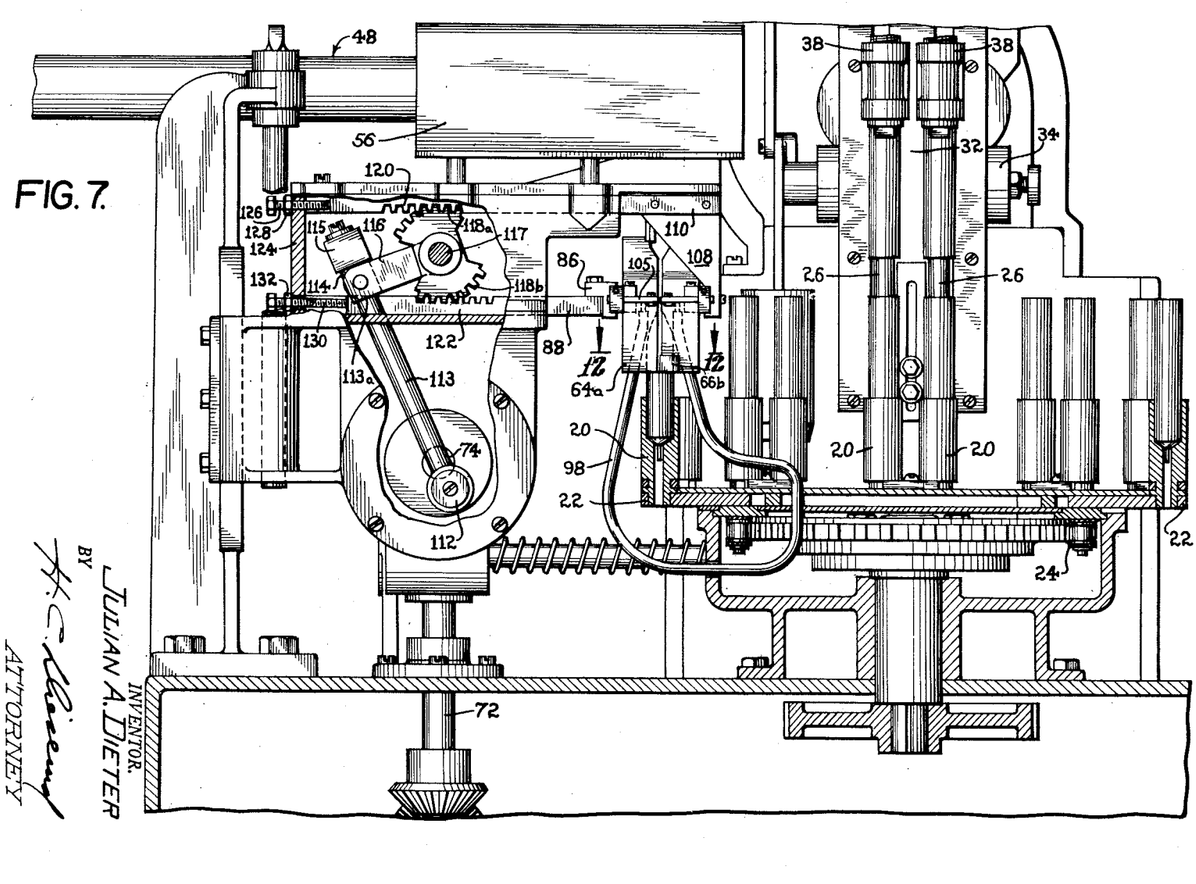
Fig. 7 is a vertical sectional view of the apparatus shown in Fig. 1 in a plane indicated at 7—7 in that figure, a portion of the apparatus being broken away to show means for opening and closing the jaws.

As shown in Fig. 13, the rear jaw 64 is mounted in a dielectric bracket 82 by means of fibre pins 84. The bracket 82 in turn is gripped by a metallic bracket 86 and attached thereto by screws 87. The bracket 86 is screwed to a horizontally reciprocable rod 88 by screws 88a. The front jaw 66 is in a like manner mounted in a dielectric bracket 89 by means of fibre pins 90. Means for carrying the bracket 89 will be described at a later point. Since the jaws become very hot during operation of the apparatus, provision is made for cooling same by means of water. For this purpose, in one embodiment, as shown in Fig. 13, there may be brazed to the bottom of the rear and front jaws respectively, hollow metallic tubes or conduits 91 and 92. These conduits are in intimate thermal contact with the jaws. As shown in Figs. 1 and 7, cooling water is supplied to the apparatus through a metallic conduit 94, and a flexible conduit 96 of rubber or like material connecting the conduit 94 with the conduit 92. There is provided a flexible conduit 98, of rubber, for example, connecting conduit 92 with the conduit 91. The water circulates through the conduit 91 and a flexible conduit 100 connected to this conduit, and leaves the system through a metallic conduit 102 connected to the conduit 100.

In another embodiment, means for cooling the jaw may, as illustrated in Fig. 11a, include a manifold or water chamber 91' provided with a longitudinal bore. Cooling water may be supplied to this bore through conduits 98' and 100'.

Since the tubes become very hot and quite molten in the region of the jaws, provision is made for holding the molten metal in place immediately above and below the metallic portion of the jaws. For this purpose each of the jaws 64 and 66, as shown in Fig. 13, is faced on its top and bottom horizontal faces near its vertical face with dielectric strips 104a and 104b, respectively. The modified embodiment of the rear jaw, 64', shown in Fig. 11a, is provided with corresponding upper and lower dielectric strips 104a' and 104b'.

respectively. The opposed or working edges of the dielectric strips carried by the jaws should be set back slightly from the working edges of the jaws themselves, instead of being perfectly flush. In operation, therefore, when the jaws first come together it is the metallic jaws proper which exert pressure on the tubes, through insulating tape to be mentioned below, but when the high-frequency current is applied, the metal immediately between the jaws is raised to the melting point, and the jaws move slightly closer together. Under this condition, it is the upper and lower dielectric strips which grip the tubes and hold the molten metal in place. Stop means, to be described, may be provided for preventing the jaws from being pressed together too closely upon the tubes. These dielectric strips should be heat-resistant and should be of material which will not be melted or otherwise damaged by the electromagnetic field to which it will be subjected. It should also be mechanically strong enough to provide firm extensions of the jaws, capable of aiding in the compression of the ends of the tubes. A satisfactory material for this purpose is a polymer of tetrafluoroethylene. Another satisfactory material is a thermosetting copolymer of styrene such as the product of the General Electric Company known as Textolite No. 1422.

Since it is desired to heat the tubes primarily by induction, it is necessary that the metallic jaws be insulated from the tubes themselves, because otherwise the tubes themselves would serve to short-circuit the jaws. For the purpose of providing such insulation, there are mounted on the inner or opposed faces of the jaws 64 and 66 relatively thin strips 105 of dielectric material such as aniline-formaldehyde synthetic resin. These strips may be held in place by being attached to the bracket portions 82 and 89 of the jaws, by screws such as 106, shown in Fig. 10. In the jaw embodiment shown in Fig. 11a there are provided special channeled guides 107 for holding in place such dielectric strips.

As shown in Fig. 13, for carrying the front jaw 66, there is provided a pair of flanges or brackets 108 mounted on a reciprocating member or rod 110. Mounted toward the lower ends of the bracket 108 by means of screws 109 is the bracket 89, which in turn carries the front jaw 66.

Means are shown in Fig. 7 for moving the jaws toward and away from one another. For this purpose there is provided on the shaft 74 an eccentric or crank such as 112. Pivotally connected to this crank is a connecting rod 113. The connecting rod 113 is provided toward its upper end with a portion of reduced diameter, on which there is fitted a sleeve 114, adapted to rest on a shoulder 113a of the connecting rod 113. Above this sleeve there is a pad or block 115 of yielding material such as rubber or the like, held in place by a washer and a screw threaded into the upper end of the connecting rod 113. Pivotally mounted on the sleeve 114 is an arm 116. The arm 116 is rigidly connected to a rotatable shaft 117, journalled in stationary bearings, not shown. Rigidly affixed to the rotatable shaft 117 is an upper segment 118a and a lower segment 118b. The apparatus is provided with a rack 120 cooperating with the segment 118a and a rack 122 cooperating with the segment 118b. The rack 120 may be integral with the slidable rod 110 and the rack 122 may be integral with the slidable rod 88, which carry the jaws. When the shaft 74 is rotated by the system of gears driven from the main drive shaft, the lower end of the connecting rod 113 will be driven in an orbital path. The connecting rod will tend to cause the arm 116 to rock the shaft 117, thereby causing the segments 118a and 118b to reciprocate the racks 120 and 122, to alternately open and close the jaws. It may be noted that the shoulder 113a of the connecting rod 113 drives the arm 116 positively on the up stroke, to open the jaws, but that on the down stroke, for closing the jaws, the arm 116 is driven by the rubber pad 115. Thus there is provided a yielding type of drive for the jaw-closing motion.

It has in certain operations been found desirable to provide mechanical stops for the racks 120 and 122, designed to prevent the jaws from exerting too much pressure on the tubes being sealed. For this purpose, as shown in Fig. 7, there is provided a vertical frame plate or member 124, through which there is threaded a screw or stop 126. This screw may be adjusted to position the right-hand or forward end of the screw, and this forward end is adapted to serve as a stop to limit the motion of the rack 120 toward the left, on the down stroke of the connecting rod 113. To hold the stop in place, there is provided a lock nut 128 threaded onto the screw 126, and engaging the plate 124.

There is also provided a stop for the lower rack 122. The plate 124 is provided with a bore, and there is provided a screw 130, passing through the bore, the screw having a threaded shaft small enough to clear the sides of the bore. This screw is threaded into the left-hand end of the rack 122 and reciprocates with this rack. Threaded onto the screw 130, and positioned on the left-hand side of the plate 124, is an adjustable stop nut 132, adapted to abut against the left-hand side of the plate 124 toward the end of the motion to the right of the rack 122, thereby limiting this motion.

The stops thus described, operating in conjunction with the yielding pad 115, serve to prevent the jaws from exerting too much compression on the ends of the tubes.

The closing of the jaws serves the mechanical purpose of pressing the ends of the tubes together, and in addition completes the current path. Electrical power delivered by the oscillator during the time the jaws are pressed together serves to produce a great enough alternating magnetic field through the tubes to induce heating effects sufficient to fuse the ends of the tubes as they are pressed together.

One of the important purposes of the present invention is to provide uniform heating and sealing of the ends of the tubes. Several embodiments of jaw structures are disclosed herein designed for this purpose. One embodiment is illustrated in Figs. 10, 11 and 13. Another embodiment is illustrated in Fig. 10a. A still third embodiment is illustrated in Fig. 16. The first two embodiments mentioned are somewhat preferred over the third one.

The embodiment shown in Figs. 10, 11 and 13 may first be considered. The working faces or edges of the metallic, electrically conducting portions of the jaws may be contoured in the regions between the tubes, as shown in Fig. 10, to form hollowed-out or bowed-out portions 64c and 66c. These hollowed-out portions may be in the form of generally vertical semicircular channels, spaced intermediate the tubes, and, in case two tubes are to be sealed simultaneously, as shown in Fig. 10, they may be spaced approximately equidistant from the ends of the jaws. Stated differently: the metallic portions of the jaws are shaped so that when they are in the "closed" position, they come almost together at points where the tubes are located, but at certain points between the tubes they remain spaced apart somewhat, even when in the extreme "closed" position, because of their mutually concave shapes. With jaws so designed it has been found that more uniform heating and sealing of the tubes may be obtained. While the reason for this effect may not at present be completely understood, the current from the oscillator passing longitudinally through the jaws and around the tubes would appear to have its path modified somewhat by the bowed-out construction. As a direct or indirect result of the distortion of the current path, it would appear that the alternating magnetic flux density toward the center of the region between the jaws would be lessened. This effect would seem to extend as far as the portion of the tubes near the center of the jaws, thereby reducing the induced eddy currents in these regions and preventing overheating there, as desired. In other words, it is believed that the channels serve to decrease the ratio of the current density in the jaws near the mid portions of their opposed working faces to the current density near the end portions of these faces, thereby correspondingly reducing the ratio of the alternating magnetic flux density in the mid portion of the space between the tubes to the flux density near the end zones. As stated, in the absence of such channels or other variations described and shown herein, the adjacent corners of the tubes become overheated while the remote corners are underheated; hence the effect of the channels in causing relatively less heating toward the center is a desirable one.

The portions of the opposed faces of the jaws which are opposite the positions where the tubes are actually engaged may be termed the active surfaces.

In Fig. 10a there is shown in plan view a fragmentary portion of a modified type of jaw 64' near the center thereof. This jaw is provided on its working face with a small vertical channel or slot 46c', conveniently of rectangular cross section, designed to perform the same general function as that described in connection with the channel 64c of the embodiment shown in Fig. 10. In Fig. 10a, portions of a pair of tubes are shown, to indicate that the slot 64c' is in a generally intermediate position. Although not shown in Fig. 10a for the sake of clarity of illustration, it will be understood that a strip of insulating material similar to 105 will be interposed between the jaw of Fig. 10a and the tubes to prevent the tubes from short-circuiting the jaws.

It may be seen that the working faces of the jaws of Figs. 10 and 10a grip the tubes along a line passing across the tubes near their ends, being shaped to have a "100-per-cent bite" along this line at the position of each tube, but being contoured between the tubes to provide less than "100-per-cent bite," in order to control the magnetic field and hence the heating effects in the tube, thereby providing uniform sealing action. In the region where the tubes are actually engaged by the jaws, in the present illustration the jaws are shown as each planular. They could in this region, however, be shaped so that one jaw is slightly concave and the other slightly convex, whereby they fit together.

Reference is made to Fig. 16, representing a third modification of the jaws. In this figure there is shown a pair of front and rear jaws 136 and 138, respectively, provided with slots 140 extending into the jaws generally transversely from their edges opposite their working edges or faces. They may in some cases, as shown, be cut on somewhat of a slant, primarily for mechanical reasons. The slots may be positioned near the ends of the jaws, that is, near the outer or remote corners of the tubes.

Assuming that a certain current is to flow through the jaws, it is believed that one effect of these jaws in Fig. 16 is, by interrupting the current path in the regions of the slots, to cause the current density to be higher in the region near the remote corners of the tubes than would be the case if the slots were absent. Hence it would appear that the slotted arrangement of this embodiment, like those of the previously discussed embodiments, would tend to decrease the ratio of the current density near the middle of the working faces of the jaws to the current density near the ends of said faces. As a result, the relative heating effect near the remote corners of the tubes, as compared with the heating effect near the adjacent corners of the tubes, may be increased, to provide uniform sealing.

It is to be understood that the present invention is not to be limited by any scientific theories which may have been advanced in an attempt to explain the results obtained.

It is also to be understood that while in the present discussion the heating effects have been referred to as caused by the alternating magnetic field and the currents in the tubes induced thereby, the invention is not to be limited by this concept. Thus there will be some electric field produced between the jaws, and a part of the heating effect may result therefrom. The important feature of the sealing apparatus is that the structure of the jaws described, when used in conjunction with the other apparatus disclosed, produces the desired results.

After leaving station C, where they are sealed, the tubes are advanced to station D, where if desired their ends may be folded, bent, or otherwise distorted in order to improve their appearance. Details of apparatus for performing such crimping operations will not be described herein, since such details do not comprise an important part of the present invention. The crimping may comprise one or a plurality of steps, and various modifications are possible.

While the apparatus illustrated in the drawings does not conform in this respect precisely to Lathrop Patent 2,213,317 issued September 3, 1940, reference may be made to that patent for a description of typical means for manipulating the ends of tubes after they are sealed.

The tubes, after leaving station D, are then advanced to station E where means not to be described herein in detail are provided adapted to grip the tubes, lift them from their tube holders, swing them away from the path of travel of the tube holders, and drop them into a chute 142, down which they slide onto a moving conveyor belt 144. This completes the operations.

In recapitulation, the mode of operation is such that tubes are loaded onto the conveyor at station A by the operator, are advanced to and stopped at filling station B in pairs, and are rapidly filled at this station by the special filling apparatus disclosed herein designed to diminish air-locking and frothing. They are then advanced to sealing station C and stopped in pairs between the jaws. The jaws are adapted to squeeze the ends of the tubes shut and also to form when closed a conducting path around the tubes for an electrical current from a high frequency current source to which they are connected when closed. This current induces heating currents in the tubes sufficient to seal them, and the jaws are shaped as described to provide a uniform seal. Moreover, the filling apparatus and sealing apparatus cooperate to give rapid, efficient overall operation. The tubes, after being sealed, are advanced to station D where they may be crimped or otherwise manipulated, and finally to station E where they are automatically removed from the conveyor and dropped down a chute for delivery to a moving belt.

While a suitable form of apparatus and mode of procedure, to be used in accordance with the invention, and various improved products resulting therefrom have been described in some detail, and certain modifications have been suggested, it will be understood that numerous changes may be made without departing from the general principles and scope of the invention.

I claim:

1. In apparatus for filling and sealing collapsible metallic tubes, of the type having a filling station, a sealing station, and means for holding said tubes vertically and for advancing successive pluralities of same to successive stations, sealing means located at said sealing station comprising a pair of opposed metallic jaws adapted to receive and press therebetween the open ends of a plurality of said tubes, means adapted to open and shut said jaws, a source of high frequency electric current connected to one end of said pair of jaws at least when they are closed, a conductor interconnecting said jaws at their other end at least when they are closed, thereby forming a current loop around said tubes, and timing and switching means for causing current to flow from said source around said loop for a short interval when said jaws are closed, the opposed faces of said jaws having opposed, generally planular, active surfaces in the region where said jaws actually press said tubes, for mechanically flattening said tubes, but the face of each of said jaws being hollowed out to form a vertical channel between its active surfaces opposite the space between said tubes to direct the current slightly away from the vicinity of said tubes in the region of their mutually adjacent corners, which might otherwise become overheated, the width of said vertical channel, as viewed in horizontal section, being less than that of any one of said active surfaces, said jaws being provided with dielectric strips on their faces adapted to prevent a short-circuit through the tubes.

2. In an inductive heating apparatus for sealing the ends of a plurality of collapsible metallic tubes simultaneously, opposed metallic jaws adapted to be opened for receiving said tubes therebetween and to be closed for engaging said tubes to press the end of each tube shut, said jaws comprising when closed a portion of a current path around said tubes for inducing heating currents in said tubes, said jaws having opposed active surfaces shaped to come substantially together, the opposed portions of said jaws between said active surfaces being concave in horizontal section to distort said current path to control the induced currents in said tubes to provide more uniform heating and sealing of said tubes, said jaws being provided with thin dielectric strips on their active surfaces and with thicker dielectric strips on their upper and lower horizontal faces.

3. In apparatus for closing and inductively sealing collapsible metallic tubes, a pair of opposed, horizontally-reciprocable jaws having opposed dielectric faces, for engaging a plurality of upright tubes spaced apart horizontally, each of said dielectric faces having in at least an active region thereof adapted to engage said tubes, a portion which is straight as viewed in a horizontal sectional plane, means for bringing said faces toward one another for mechanically closing the ends of said tubes, said jaws having metallic members behind said dielectric faces for forming a portion of a path for alternating current around said tubes, the surfaces of said metallic members immediately behind said straight portions of said dielectric faces being straight and generally parallel to said faces as viewed in a horizontal sectional plane, for bringing said current close to said tubes, but said surfaces having vertical channels between said straight portions, whereby, when said jaws are brought together upon tubes, said vertical channels are adapted to be located opposite the space between said tubes, for diverting said current away from the adjacent corners of said tubes.

4. In tube-sealing apparatus, in combination, a pair of opposed metallic jaws adapted to receive and press therebetween the open ends of a plurality of tubes, a source of high frequency electric current connected to said pair of jaws at least when they are closed, said jaws having opposed active surfaces which are straight in horizontal section in the region where said jaws actually press said tubes, for mechanically flattening the ends of said tubes, but having a hollowed-out vertical channel between said active surfaces, means electrically coupling said jaws together at a point beyond said active surfaces from said source of current, and dielectric means on said active surfaces adapted to prevent a short-circuit through said tubes.

5. In inductive heating apparatus for sealing the ends of a plurality of collapsible metallic tubes simultaneously, opposed metallic jaws adapted to be opened for receiving said tubes therebetween and to be closed for engaging said tubes to press the end of each tube shut, said jaws comprising when closed a portion of a current path around said tubes for inducing heating currents in said tubes, said jaws having opposed active surfaces shaped to come substantially together, the opposed portions of said jaws between said active surfaces being concave in horizontal section.

6. In inductive heating apparatus for sealing a plurality of collapsible metallic tubes simultaneously, a pair of horizontally reciprocable metallic jaws having opposed edges, said jaws being adapted to conduct current longitudinally to form a portion of a current loop around said tubes, said opposed edges having active surfaces, said jaws being shaped to have slots extending into same from said opposed edges, said slots being positioned between said active surfaces to modify current flow longitudinally through said jaws to decrease the heating effect in the region of the adjacent corners of said tubes, whereby to assure uniform sealing of the tubes, said jaws being provided with thin dielectric strips on their active surfaces and with other dielectric strips on their upper and lower horizontal faces, said last-mentioned strips being set back so as to retain in place metal melted by inductive sealing, without interfering with the biting action of said jaws.

JULIAN A. DIETER.

REFERENCES CITED

The following references are of record in the file of this patent:

UNITED STATES PATENTS

| Number | Name | Date |
|---|---|---|
| 2,213,317 | Lathrop | Sept. 3, 1940 |
| 2,255,103 | Denneen et al. | Sept. 9, 1941 |
| 2,293,533 | Denneen et al. | Aug. 18, 1942 |
| 2,321,189 | Dravneek | June 8, 1943 |
| 2,402,508 | Strickland | June 18, 1946 |
| 2,452,365 | Frederick | Oct. 26, 1948 |

FOREIGN PATENTS

| Number | Country | Date |
|---|---|---|
| 467,308 | Great Britain | June 15, 1937 |
| 484,316 | Great Britain | May 4, 1938 |

OTHER REFERENCES

"Electrical World," June 23, 1945, page 122.